United States Patent [19]
Seiler

[11] 3,733,093
[45] May 15, 1973

[54] PULL AND PUSH SAFETY DEVICE FOR SCREW SOCKET CONNECTIONS OF PIPES

[76] Inventor: Georg Seiler, Pachmayrplatz 11, Munich, Germany

[22] Filed: May 20, 1971

[21] Appl. No.: 145,327

[30] Foreign Application Priority Data

Mar. 10, 1971 Germany..................P 21 11 568.4

[52] U.S. Cl...............285/342, 285/348, 285/356, 285/382.7
[51] Int. Cl..............................................F16l 21/06
[58] Field of Search.................285/343, 356, 357, 285/323, 4, 328, 342, 382.7, 348

[56] References Cited

UNITED STATES PATENTS

| | | | |
|---|---|---|---|
| 3,139,293 | 6/1964 | Franck | 285/4 |
| 1,497,453 | 6/1924 | Levitt | 285/343 X |
| 1,822,887 | 9/1931 | Hagstedt | 285/357 |

FOREIGN PATENTS OR APPLICATIONS

| | | | |
|---|---|---|---|
| 1,800,923 | 8/1970 | Germany | 285/356 |
| 478,376 | 9/1969 | Switzerland | 285/343 |
| 406,205 | 3/1943 | Italy | 285/323 |
| 1,049,299 | 11/1966 | Great Britain | 285/343 |
| 858,165 | 12/1952 | Germany | 285/343 |

Primary Examiner—Thomas F. Callaghan
Attorney—Whitemore, Hulbert & Belknap

[57] ABSTRACT

The invention relates to a pull and push safety for screw socket connections of pipes, in particular malleable iron pipes, plastic pipes and large diameter pipes, such as for supply networks in cities or the like. In such pipes there is disposed in an annular chamber limited by the plane ends of the pipe and the socket equipped with an internal thread a sealing ring which is sealingly preloaded by a pressure ring screwable into the socket.

In such screw socket connections there may occur at the installed pipes extraneously acting pulling forces or pushing forces caused by the internal pressure, tending to loosen the connection between the pipe sections. The sealing rings are able to absorb these forces, which can assume a considerable magnitude, to a limited extent only. Therefore, attempts have already been made to secure such connections against pushing and pulling forces. These known measures are costly, however, because they make necessary special machining operations at the pipe ends, which often can be performed only at the construction site. In addition, the machining of the pipe surfaces, such as cutting in a clamping groove, will weaken the pipe wall which may lead to the premature breakage of the pipe.

5 Claims, 8 Drawing Figures

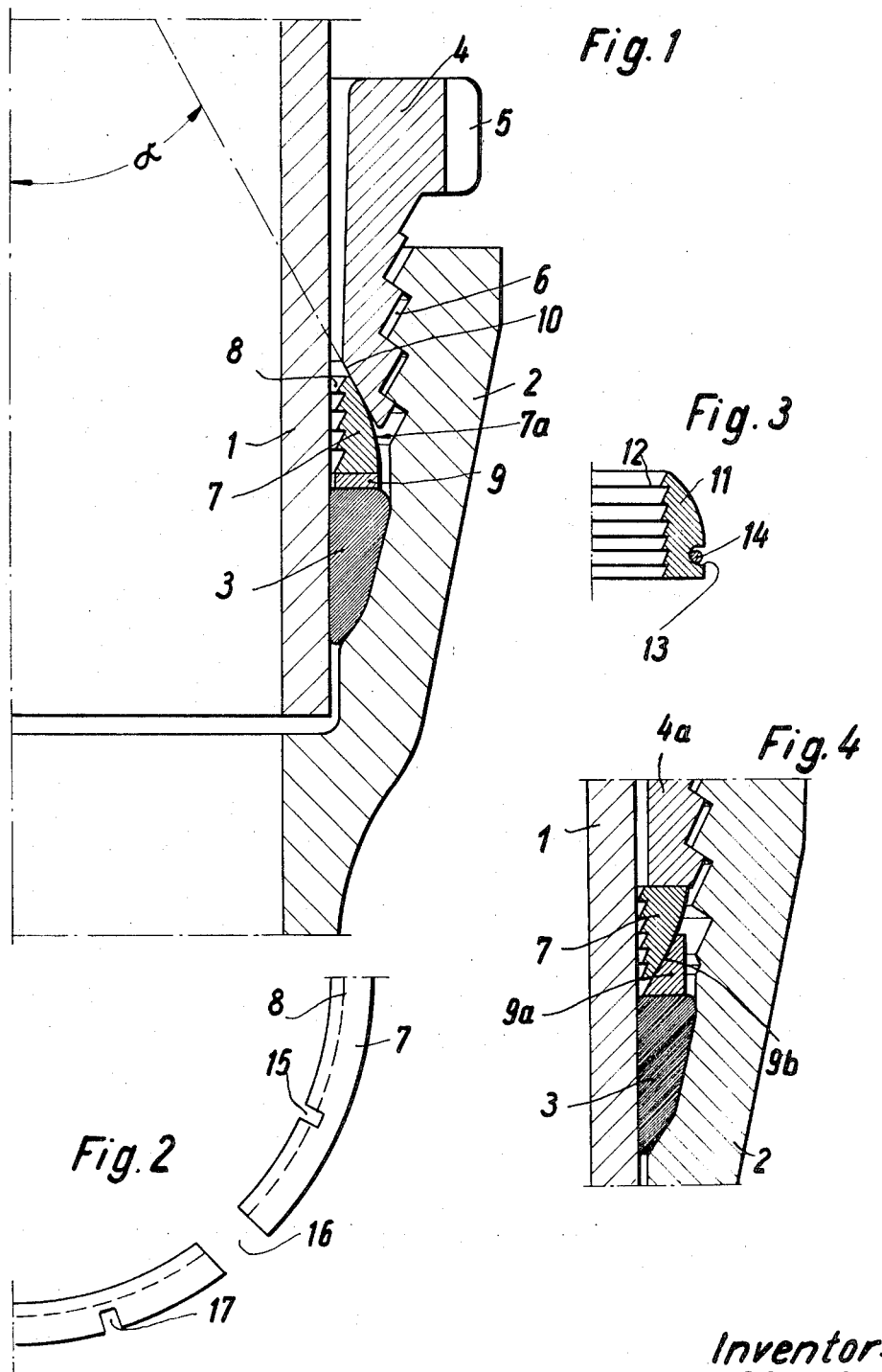

PULL AND PUSH SAFETY DEVICE FOR SCREW SOCKET CONNECTIONS OF PIPES

SUMMARY OF THE INVENTION

It is the objective of the invention to develop a safety against pushing and pulling forces of the type described at the outset so that a reliable absorption of the pulling and pushing forces is assured, sealing the pipe connection at the same time with simplicity of design and installation of the safety device.

According to the invention, this objective is achieved in that a safety ring, disposed in the annular chamber and presenting a radial separating slot of noticeable peripheral width, is pressable by means of sharp-edged elevations at the inner peripheral surface over conical surfaces at its radially outer peripheral surface as well as at the pressure ring or the sealing ring axially against the sealing ring and also radially inward against the pipe end at the same time when the pressure ring is screwed into the socket. Due to its radial separating slot the sealing ring is sufficiently elastic so that it can change its peripheral length. This makes it possible to transform the axial motion of the pressure ring, through the conical or oblique surfaces, to a motion leading to the constriction of the peripheral length of the safety ring, the sharp-edged teeth digging into the surface of the ductile material. Since considerable forces can be transmitted to the safety ring through the pressure ring, clamping force adequate for all conditions can be produced. Since the safety ring is disposed in the sealing chamber of the socket so as to be freely movable, the screwing-in motion of the pressure ring at the same time leads to the safety ring being pressed against the sealing ring in axial direction so that it is sufficiently deformed in the sealing chamber to produce a reliable seal. Should the pressure inside the pipe increase, this pressure will likewise act upon the sealing ring and the reactive pressure thus act upon the safety ring, thereby further increasing the safety effect against pushing forces. The same increase in the safety effect occurs when external pulling forces act upon the pipes, because the pipe end takes along the safety ring clawed into the pipe end, thereby pressing with increased force against the oblique surface of the pressure ring, thus increasing the clamping effect.

To improve the elasticity of the safety ring, it may present on its inner and/or outer circumferential surface several radial recesses spaced in circumferential direction.

Since the safety ring can be taken along in circumferential direction when the pressure ring is screwed in, it is expedient for a slide ring to be inserted between the safety ring and the sealing ring.

One can also automatically and advantageously promote the corotation of the safety ring in circumferential direction when the pressure ring is screwed in by expediently disposing the tooth-like projections in the manner of a thread with the same pitch as the screw thread between the socket and the pressure ring. This facilitates the introduction of the pressure ring considerably. The corotation in circumferential direction can be achieved by a projection on the oblique guide surface of the socket, said projection engaging the radial separating slot of the safety ring with considerable circumferential clearance. But the corotation can also be effected by fluting or knurling. In that case it is expedient to provide both oblique surfaces or conical surfaces with an appropriate fluting, preferably parallel to the axis of the pipes.

It has proven to be advantageous to design the corotation elements so that they force corotation only up to the attainment of a predetermined torque, yielding when this torque is exceeded so that a relative motion between the pressure ring and the safety ring can occur.

Expediently, the axial length of the safety ring is greater than its radial width. The outer circumferential surface of the safety ring, appropriately oblique for cooperation with the conical surface of the pressure ring, is expediently crowned to make it possible for the safety ring to tilt in the socket when the pipe axes are not in alignment.

In the following, the invention is explained in greater detail by way of several implementation examples and schematic drawings.

BRIEF DESCRIPTION OF THE DRAWINGS

FIG. 1 shows, in longitudinal section, a screw socket connection according to the invention.

FIG. 2 is a top view of a part of the safety ring.

FIG. 3 is a cross section of a safety ring according to the invention.

FIG. 4 shows, in a view similar to FIG. 1, a modified implementation example.

FIG. 7 is a section similar to that in FIG. 3 and shows a modified design of a safety ring, while FIG. 8 is a section of the lower end of the pressure ring correlated with the safety ring according to FIG. 7.

DESCRIPTION OF THE PREFERRED EMBODIMENTS

Figure 5:
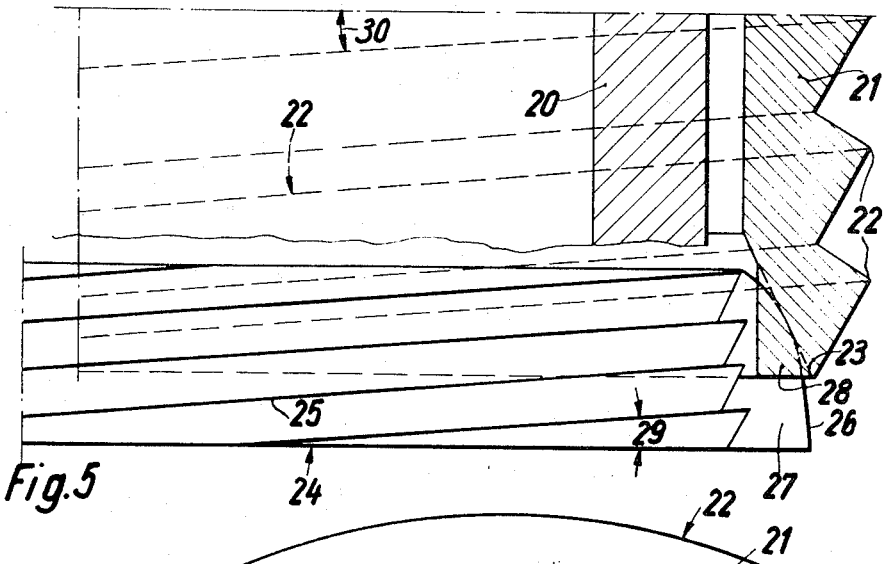
FIG. 5 shows, in larger scale, a special design of the safety ring.
Figure 6:
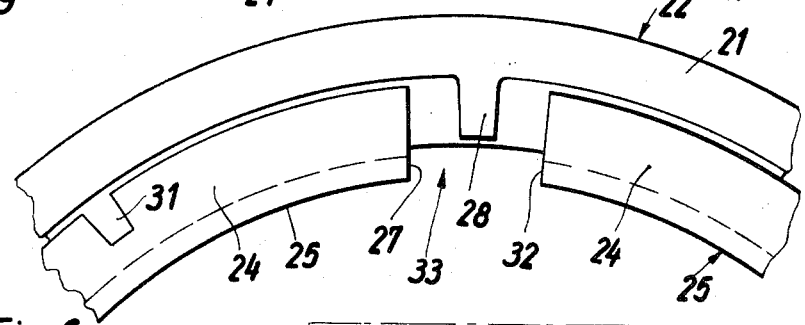
FIG. 6 shows a top view of the safety ring according to FIG. 5.

In the screw socket connection according to FIG. 1, the end of a pipe such as of malleable iron and large diameter is introduced into the connecting socket 2, a sealing ring 3 having been inserted into the chamber formed by the two. The outer end of the socket 2 is equipped with an internal thread which is engaged by the matching thread 6 of a pressure ring 4. The pressure ring 4 presents appropriate surfaces 5 for a screwing tool to engage.

In the design according to the invention, the pressure ring 4 does not act directly upon the ring 3, but upon a safety ring 7. The latter is of greater axial length than radial width. It has teeth 8 on its inner circumferential surface, which teeth can engage the peripheral area of the pipe 1. At 7a, the outside of the safety ring is crowned. This crowned peripheral surface engages a conical or oblique guide surface 10 of the pressure ring. This guide surface is disposed at a certain angle alpha relative to the pipe centerline. The plane face surface of the safety ring 7 rests against an intermediate or slide ring 9 which, in turn, rests against the upper or outer side of the sealing ring.

It becomes clear that, after the pipe end 1 is inserted and the pressure ring 4 screwed in, the oblique surface 10 acts upon the safety ring, first pushing the latter in front of itself in axial direction until it rests against the slide ring 9 or the sealing ring 3. The axial resistance thereby building up in the sealing ring takes care that the crowned surface 7a slides along the guide surface 10, thus constricting in radial direction the safety ring, which presents a radial separating slot 16, until its teeth 8 dig into the peripheral surface of the pipe end 1. This establishes the safety lock. If pushing or pulling forces now occur at the two pipes, such as by internal pressure or external action, the effect thereof is that the safety ring 7 is pushed against the oblique surface of the pressure ring with an even greater force, thereby increasing the radial clamping effect accordingly.

To enable easy adaptability of the safety ring to the peripheral contour of the pipe end, the ring may present, as FIG. 2 shows, radial recesses 15, 17 at its outer or inner circumferential surface.

The safety ring 11 according to FIG. 3 presents a peripheral groove 13 into which is inserted a flexible or preferably elastic preloading member which keeps the safety ring 11, equipped with separating slot, under a predetermined preload.

In the implementation example according to FIG. 4, the oblique surface 9b is provided at the slide ring 9a. The pressure ring 4a here presents a plane face surface.

FIG. 5 shows, in larger scale, another design of the safety against pushing forces according to the invention. To demonstrate this, FIG. 5 only shows the broken-off end 20 of the inserted pipe and the lower end of the correlated pressure ring 21. For clarity's sake, the correlated socket is not shown. It may correspond to the sockets according to FIGS. 1 and 4.

The external thread 22 of the pressure ring 21 presents a predetermined pitch, indicated at 30 and matching the pitch of the thread of the socket.

The safety ring 24 whose separating slot 27 lies just about in the plane of the section of FIG. 5, presents teeth 25 which are likewise disposed in the manner of a thread, the pitch of this thread matching exactly the pitch 30 of the external thread 22 of the pressure ring 21, as indicated at 29.

The lower end of the pressure ring again presents an oblique guide surface 23 which cooperates with the crowned peripheral surface 26 of the safety ring 24. There emanates from the oblique surface 23 at a peripheral point an inwardly protruding projection 28 which can engage the separating gap 33 between the faces 27 and 32 of the slotted safety ring 24, as FIG. 4 shows. Upon turning the pressure ring 21 while screwing it in, the projection 28 makes contact with one face of the safety ring 24, taking it along in circumferential direction. Since the tooth-like projections 25 of the safety ring have the same pitch as the thread of the pressure ring, the safety ring progresses along the periphery of the pipe 20 at the same rate as the pressure ring 21 in the screw socket.

The projection 28 is advantageously so designed that it yields upon exceeding a predetermined torque so as to enable thereafter a relative motion to occur between the pressure ring and the safety ring which claws more strongly into the peripheral surface of the pipe end 20.

Figures 7, 8:
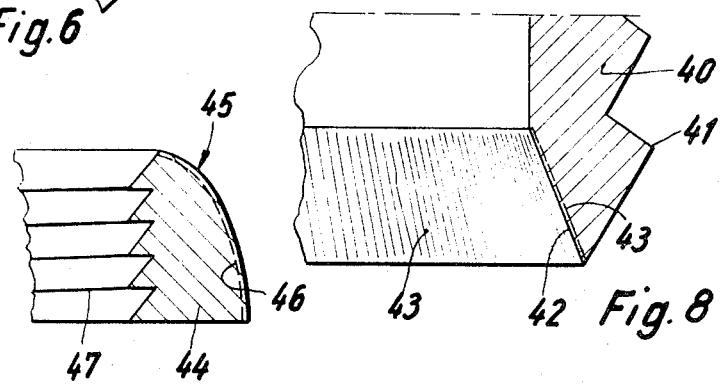

The corotation in circumferential direction can also be assured in other ways, such as by appropriate roughnesses of the cooperating surfaces. This can be accomplished, for example, by an appropriate knurling or fluting, as shown in FIGS. 7 and 8. In them, the safety ring 44, equipped with the internal teeth 47 in accordance with the ring shown in FIG. 5, presents on its crowned, peripheral surface 45 a fluting as indicated at 46. The oblique surface 42 at the lower end of the correlated pressure ring 40 is provided with corresponding flutings 43 which can engage the flutings of the safety ring in order to assure reliable corotation of the safety ring when turning the pressure ring 40.

In the implementation examples shown in FIGS. 5 to 8, the safety ring 24 or 44, respectively, presents an unobstructed inside diameter slightly larger than the largest outside diameter of the pipe end 20 possible within the permissible tolerances. Therefore, when the correlated pressure ring 21 or 40 is screwed into the correlated socket to make the connection, the oblique or crowned surfaces of the pressure ring 21 or 40 and the correlated safety ring 24 first get into mutual engagement so as to take the safety ring along reliably in circumferential direction during the continuing screwing motion. Since the teeth do practically not or only very slightly engage the external peripheral surface of the introduced pipe end, the safety ring is taken along by the pressure ring in axial direction without radial constriction until the safety ring strikes the sealing ring inserted in the sealing chamber. It is only through the resistance offered by the sealing ring to further axial motion that a relative motion axially occurs between the pressure ring and the safety ring, through which motion the diameter is decreased due to the oblique surfaces, until the teeth engage reliably the periphery of the introduced pipe end. Upon the continued screw motion of the pressure ring in the socket, the safety ring progresses on the periphery of the pipe end at the same rate as the pressure ring in the socket because the pitches of both threads are identical. Therefore, after the engagement of the teeth in the peripheral end of the pipe, the pressure exerted on the sealing element can also be increased by continuing to screw in the pressure ring without thereby changing the relative position between the pipe end and the socket. This is of importance in many cases of the installation of pipe line networks in which pipe line sections of several pipe elements must be so installed that in making the connection between the various pipe elements practically no noteworthy relative motion axially occurs between the pipe ends and the sockets. This specification can be met in reliable manner by the design according to FIGS. 5 to 8 wihtout impairment of the sealing effect and the protection against pushing and pulling forces.

The corotation of pressure ring and safety ring can also be assured in other conventional ways by the force-closing or form-closing engagement between the two parts.

What is claimed is:

1. A pull and push safety device for screw socket connections of pipes having at least one smooth end and at least one socket end, said socket end having an annular internal shoulder, being internally threaded and forming an annular chamber in which the smooth end of a pipe is seated with radial and axial play comprising a pressure ring disposed in said chamber surrounding the smooth end of the pipe and having at least a portion of its radially outer surface provided with threads, thereby threadedly engaging the internally threaded socket end and further having an oblique lower radially inner peripheral surface, said oblique surface having a radially inwardly directed projection emanating therefrom; a safety ring disposed in said chamber surrounding the smooth end of a pipe adjacent the pressure ring and having a degree of radial play and having a greater cross-sectional length than radial cross-sectional width, a radial separating slot adapted to be engaged by said radially inwardly directed projection, sharp-edged, thread-like elevations at the radially inner peripheral surface, said elevations having the same pitch as the threads of the pressure ring, circumferentially spaced apart, radially extending recesses in its inner and outer peripheral surfaces, and a crowned, radially outer peripheral surface adapted to be engaged by the oblique surface of the pressure ring; and a sealing ring disposed in said chamber surrounding the smooth pipe end, engaging said internal shoulder, and sealingly preloaded by the safety ring and the pressure ring.

2. Pull and push safety device according to claim 1, characterized in that pressure ring and safety ring are in mutual connection for joint motion in circumferential direction.

3. Pull and push safety device according to claim 2, characterized in that the connection between the pressure ring and the safety ring for their joint motion in circumferential direction yields after a predetermined torque is exceeded.

4. Pull and push safety device according to claim 2, characterized in that the cooperating surfaces of the pressure ring and the safety ring present mutually matching flutes or knurls, preferably extending parallel to the axis of the components.

5. Pull and push safety device according to claim 1, characterized in that the safety ring consists of two or more annular sectors held together by a ring of elastic or flexible material inserted in a peripheral groove.

* * * * *